Oct. 3, 1961 E. FRANKE ET AL 3,002,429
BEARING ARRANGEMENT FOR SUPPORTING A ROTATABLE
ELEMENT OF A MACHINE TOOL OR THE LIKE
Filed July 29, 1957 2 Sheets-Sheet 2

INVENTORS
Erich Franke
Wilhelm Grolman
Bernhard Braun
Volker Weyrauch
BY: Michael S. Striker
ATTORNEY 3,002,429
BEARING ARRANGEMENT FOR SUPPORTING A ROTATABLE ELEMENT OF A MACHINE TOOL OR THE LIKE
Erich Franke, Aalen, Wilhelm Grolman, Dortmund-Kirchorde, Bernhard Braun, Dortmund, and Volker Weyrauch, Lippstadt, Germany, assignors to Eisenwerk Rothe Erde G.m.b.H., Dortmund, Germany
Filed July 29, 1957, Ser. No. 674,907
Claims priority, application Germany Aug. 11, 1956
8 Claims. (Cl. 90—58)

The present invention relates to machine tools or the like.

More particularly, the present invention relates to that type of machine tool wherein a work supporting table is required to rotate about a predetermined axis. For example, vertical boring mills and gear-cutting machines have such tables which are required to rotate about a predetermined axis with respect to a supporting frame of the machine tool.

At the present time the bearing structures which support such tables for rotation are exceedingly complex and are usually composed of a plurality of completely independent bearing units provided for respectively absorbing axial and radial forces, which act on the table, and additional bearings may be provided to take up other forces, a kingpin is usually provided beneath the table and at substantially the center thereof which also contributes to the support of the table for rotation.

Not only are these structures complex because of the plurality of bearing units included therein, but also it is very difficult to eliminate undesirable play because of the distances between the several bearing units.

One of the objects of the present invention is to overcome the above drawbacks by providing in a machine tool of the above type a single bearing means which is capable of absorbing all of the forces which act on the rotary table.

Another object of the present invention is to provide an extremely simple arrangement which can be adjusted so as to have no play and which is capable of absorbing all forces which act on the rotary table.

A further object of the present invention is to provide a bearing arrangement which supports a rotary table on a supporting frame in such a way that very little space is taken up by the bearing structure and a considerable amount of free space remains in which may be located structure which up to the present time has been located outside of but adjacent to the machine tool, so that this latter structure need not take up additional space with the arrangement of the invention.

An additional object of the present invention is to provide an arrangement of the above type wherein a drive for the table may be located directly beneath the latter within the supporting frame of the machine tool so that additional space need not be provided at one side of the machine tool for such a drive.

It is to be understood that the invention is applicable to all structures wherein a work supporting table or the like is required to rotate with great precision about a predetermined axis.

With the above objects in view, the present invention mainly consists of a machine tool which includes a supporting frame and a table located thereover. A single bearing means is provided between the supporting frame and table and cooperates with the supporting frame and table to support the table for rotation about a predetermined axis with respect to the supporting frame, this bearing means forming the only bearing means which supports the table for rotation and this bearing means including at least one annular row of bearing elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In accordance with the present invention the bearing structure is one which is not especially designed for the machine tool in which it is used, and furthermore the bearing structure is of a type which is capable of absorbing axial and radial forces as well as forces in other directions. Complete bearing units may be inserted into the machine tool assembly or parts of the machine tool structure may form parts of the bearings. The bearing structure can be directly connected to the supporting frame and rotary table of the machine tool or suitable elements may be interposed between the supporting frame and rotary table, on the one hand, and the bearing structure per se on the other hand. In all cases, however, a single bearing unit is provided to support the table for rotation about its axis.

Figure 1:
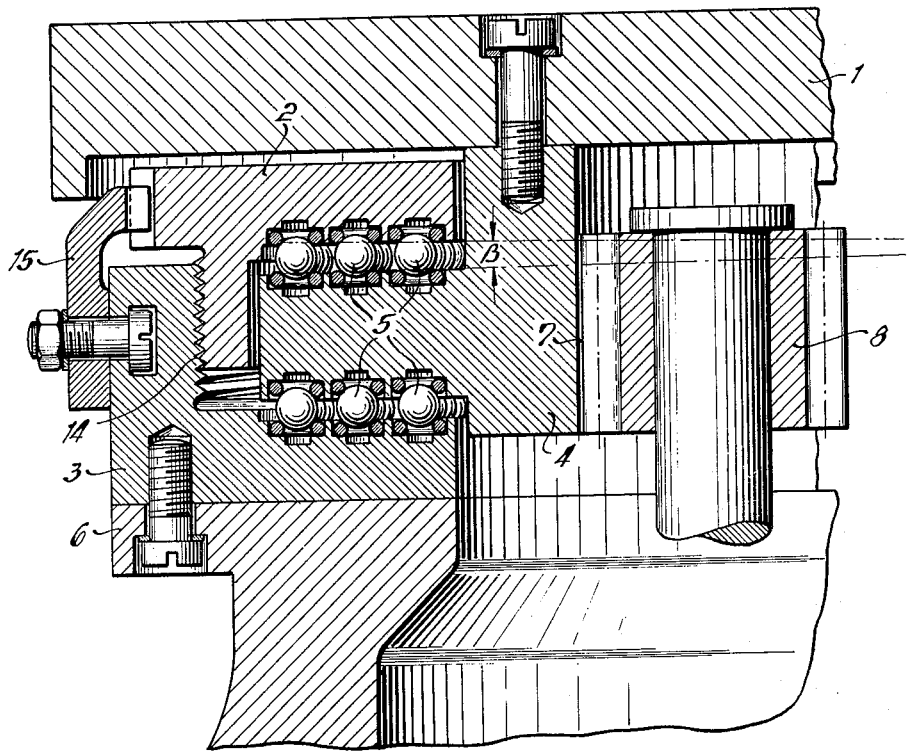
FIG. 1 is a fragmentary sectional elevational view taken in a plane which includes the axis of rotation of a work supporting table and showing only one end of this table together with the bearing structure which supports the same and part of the supporting frame of the machine tool.

Referring to FIG. 1, a portion of the rotary table 1 is shown in section located over the stationary supporting frame 6. In accordance with the present invention a bearing means is located between and cooperates with the frame 6 and the table 1 to support the latter for rotation with respect to the frame 6 about a predetermined axis which extends vertically and is located to the right of the structure which is shown in FIG. 1. This bearing means includes, in the embodiment of FIG. 1, a table ring 4 which is fixed coaxially with the rotary table 1 to the underside of the latter by any suitable means such as the screw elements shown in FIG. 1. Of course, if desired, this ring 4 could be formed integrally with the table 1. Also, the bearing means includes a frame ring 3 which is fixed to the top face of the frame 6 in the manner indicated in FIG. 1, this ring 3 being coaxial with the ring 4 and being fixed to the frame 6 by screw elements, although here again the ring 3 could also be integral with the frame 6. It will be noted from FIG. 1 that the screw elements which fix the rings 3 and 4 respectively to the frame 6 and the table 1 are easily accessible from the exterior of the machine.

A third adjusting ring 2 is threadedly connected at 14 to the frame ring 3, in the embodiment of FIG. 1. Thus, the ring 3 includes an upwardly extending annular portion provided with inner threads which cooperate with outer threads formed on a downwardly extending annular portion of the adjusting ring 2. With the structure of FIG. 1 the ring 4 has an outwardly extending annular flange portion which is located between a pair of inwardly extending annular flange portions of the rings 2 and 3, and the bearing structure itself is formed by and located in the spaces between these several flange portions. Thus, as may be seen from FIG. 1 the flange portions are formed with suitably stepped annular grooves which support wire races, and a plurality of rows of ball members are in engagement with the wire races and located therebetween. It is apparent that by turning the ring 2 with respect to the ring 3 the bearing structure may be adjusted so that there is no play for the ball members 5 and so that all stresses may be taken up efficiently by the bearing means. At one or more points along the outer periphery of the ring 3 a lock element 15 may be located by the bolt and nut connection shown in FIG. 1, the head of this bolt being located in a T-slot formed in the ring 3. The lock element 15 has at its upper end an inwardly extending projection which is adapted to extend into one of a plurality of axial grooves formed in the outer periphery of the ring 2, so that after the ring 2 is adjusted the member 15 may be placed in the position indicated in FIG. 1 for maintaining the ring 2 in the adjusted position. It will be noted that at either side of the element 15 the ring 2 is equally accessible from the exterior of the machine so that adjustment may be made at any time with all of the structure assembled as indicated in FIG. 1.

With the arrangement of FIG. 1, there are three upper and three lower rows of ball members, each set of upper and lower rows having its rows of ball members respectively located along circles which are located in a common plane and the circles in each plane have a common center located in the axis of rotation of the table 1. Furthermore, the four wire races which cooperate with each annular row of ball members enable each row together with its wire races to absorb forces acting on the table 1 irrespective of the direction of these forces. The embodiment of FIG. 1 is particularly suited for tables which are required to rotate at relatively high speeds and where especially high linear speeds are present at the outer periphery of the rotary table adjacent which the bearing means of the invention is located. By providing the several rows of ball members and races cooperating therewith as shown in FIG. 1 the load on each ball member and on each wire race is quite small so that the structure of FIG. 1 is capable of being used efficiently in an arrangement where the table 1 is required to rotate at a relatively high speed under a relatively large load. In order to maintain the heating up of the wire race ring to a minimum, the area of contact between each of the wire race rings and the ball members engaging the same is maintained at a minimum, the wire race rings of the invention preferably being unground. In other words, in bearings of this type the wire races are sometimes preground so as to be provided with the surfaces along which the bearing elements roll, but with the bearings of the invention it is preferred that the wire races remain unground.

According to a further feature of the invention, the rolling angle of the bearings which make up the single bearing means of FIG. 1 is maintained at a very low value, and in accordance with the present invention the several rows of ball members of the upper set of annular rows of ball members of FIG. 1 engage their races at a plurality of points which in any radial plane which includes the axis of rotation of the table 1 are located along a pair of straight lines which are inclined with respect to each other and intersect at the turning axis of the table 1 and which form between themselves the angle β shown in FIG. 1.

The table 1 may be provided with openings through which the adjusting ring 2 is accessible from above, and these openings may be closed with any suitable insert or cover members carried by the table 1.

It will be noted that the several rows of ball members and cooperating races of FIG. 1 which make up the single bearing means thereof are all located very close to each other so that there will be no play resulting from the distance between a plurality of bearings and the ring 2 is adjusted to eliminate any play.

Figure 2:
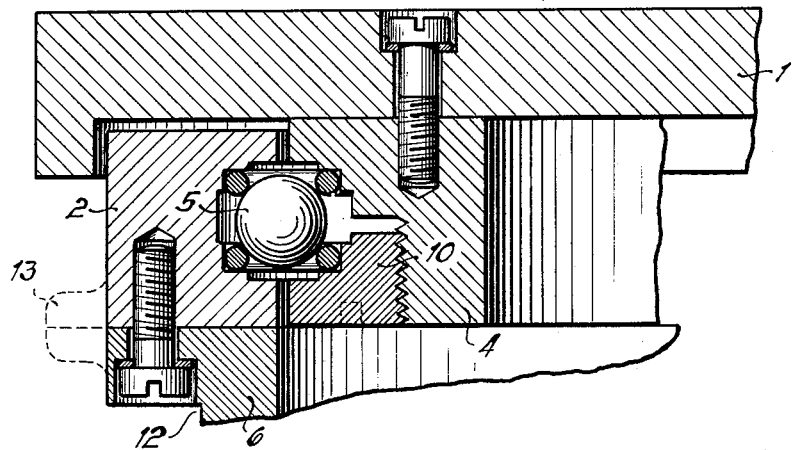
FIG. 2 is a view similar to FIG. 1 of a different embodiment of a structure according to the present invention.
Figure 3:
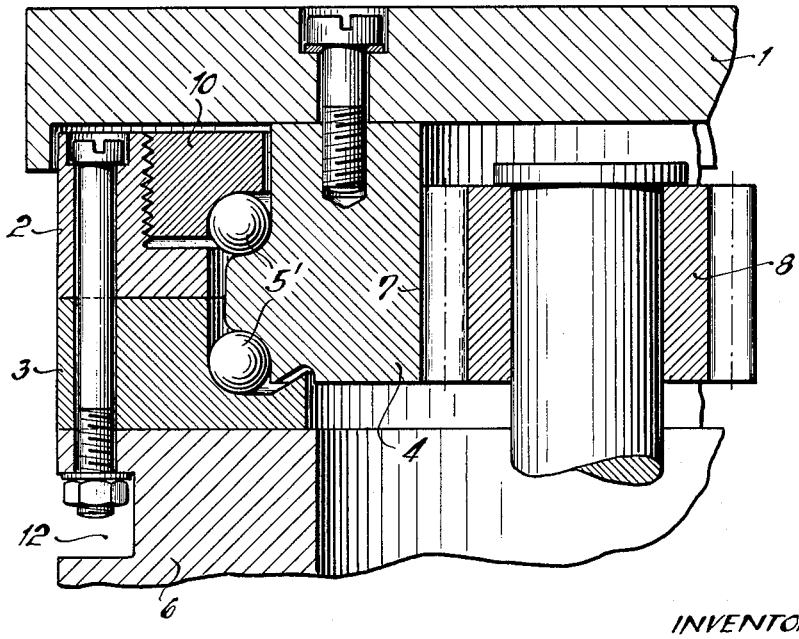
FIG. 3 is a sectional elevational illustration of a third embodiment of a structure according to the present invention.

According to the embodiment of the invention which is illustrated in FIG. 2, the supporting frame 6 is provided in its outwardly directed flange 12 with bolts which serve to fix to the supporting frame 6 a frame ring 2a which is provided at its inner periphery with a suitably stepped annular groove to form the support for a pair of wire rings of the bearing means of FIG. 3. If desired, the ring 2a and the flange of the supporting frame 6 may be provided with outwardly directed flanges 13 through which bolts may extend for interconnecting the ring 2a with the frame 6, or, the ring 2a may be formed integrally with the frame 6. Of course, with the arrangement shown in solid lines in FIG. 2 where there are no flanges 13 there is the advantage that the frame does not include any outwardly extending portions. With the embodiment of FIG. 2 a table ring 4a is fixed to the underside of the rotary table in the same way as the ring 4 of FIG. 1, and this ring 4a is provided with suitably stepped shoulders to form a support for the upper right wire race of the bearing of FIG. 2. With the embodiment of FIG. 2, however, the adjusting ring 10 is threadedly connected to the table ring 4a rather than to the frame ring as was the case with the embodiment of FIG. 1. This ring 10 is also formed with a suitably stepped shoulder so that the ring 10 supports the lower right race of the bearing of FIG. 2, this bearing including the ball members 5a which roll along the four wire races shown in FIG. 2. By turning the ring 10 which is threadedly connected at its inner periphery to the lower outer periphery of the ring 4a the bearing can be adjusted so that it has no play, and the bearing of FIG. 2 produces all of the above-discussed advantages. It should be noted that with the embodiment of FIG. 2 the frame 6 is provided adjacent its top end with suitable openings through which access may be had to the lower face of the ring 10 which may be provided with suitable recesses adapted to receive a spanner wrench or the like for permitting this ring 10 to be adjusted from the exterior of the construction shown in FIG. 2.

The embodiment of FIG. 3 includes a bearing construction different from that above-described in that it does not have wire races. With the embodiment of FIG. 3 suitable bolts and nuts which are accessible at the exterior of the frame 6 serve to fixedly connect to the latter the frame ring 3b as well as the ring 2b located directly on top of the ring 3b, as indicated in FIG. 3. The frame ring 3b is formed with a shoulder which is curved so as to form an annular bearing race coaxial with the turning axis of the table 1 and this bearing race engages the lower row of ball members 5' of FIG. 3 along an arc of contact which is on the order of 90°, as is evident from FIG. 3. The ring 2b is formed at its inner periphery with threads which cooperate with outer threads of an adjusting ring 10' which corresponds to the ring 10 of FIG. 2 but which in the embodiment of FIG. 3 is accessible through suitable openings formed in the table 1, these openings being closed in any suitable way when it is not desired to have access to the adjusting ring 10'. This adjusting ring 10' is itself formed at the lower portion of its inner periphery with a shoulder having the curved concave cross section indicated in FIG. 3 so as to provide a second bearing race which will engage each of the ball members of the upper row of ball members 5' along an arc on the order of 90°. Of course, the rings 2b and 3b may be integral with each other and the ring 3b may be integral with the supporting frame 6, if desired.

The single bearing rings of FIG. 3 further include a table ring 4b which is fixed to the underside of the table 1 coaxially with the axis of rotation thereof by screw members one of which is indicated in FIG. 3. This table ring 4b is formed with a pair of ball races which are respectively directed toward the above-described races of the rings 3b and 10', and each of these races of the ring 4b are concavely curved so as to engage each ball member along an arc on the order of 90°. Thus, with the arrangement of FIG. 3 a pair of rows of ball members 5' are provided one above the other, and each of these annular rows of ball members is in engagement with a pair of diametrically opposed races each of which engages each ball member along an arc of contact on the order of 90°. Thus, the bearing structure of FIG. 3 is also capable of absorbing forces acting on the table 1 irrespective of the direction of these forces and by adjusting the ring 10' all play may be eliminated and the table 1 can be supported for rotation with respect to the frame 6 in a very efficient manner which requires only the bearing means of FIG. 3.

With all of the embodiments of the invention, because the single bearing means is located adjacent the outer periphery of the table 1 there is a considerable space left beneath the table 1, and advantage may be taken of this fact to locate in this space the drive means for the table 1, in accordance with the present invention, this drive means being conventionally located outside of the frame 6 so that floor space is required for the same. Because the arrangement of the invention locates the entire bearing structure adjacent the outer periphery of the table 1, the inner periphery of the rings 4, 4a, or 4b may, in accordance with the present invention, be provided with teeth 7 so that the ring connected to the underside of the table 1 also acts as a gear, and a pinion 8 of a drive means surrounded by the frame 6 as well as the table ring 4, 4a, or 4b meshes with the internal ring gear 7 for driving the table 1 so as to rotate the latter about its axis of rotation. Thus, in accordance with the present invention the drive means is located within the space surrounded by the bearing means and is housed within the hollow supporting frame 6 so that an extremely compact arrangement may be provided. This is in sharp contrast to conventional constructions where the space beneath the table 1 is taken up by kingpin elements and the like.

The above-described structure may be used in vertical boring mills or in gear-cutting machines, or in any structure where a table or the like is required to rotate in a precise manner about a predetermined axis.

It will be understood that each of the elements described above, or two or more together, may also find a useful application in other types of machine tools differing from the types described above.

While the invention has been illustrated and described as embodied in bearing arrangements for machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, a rotary table having a central axis of rotation and an outer peripheral portion; a supporting frame located beneath and spaced from said table and having an upper annular portion directed toward said peripheral portion of said table; and a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation.

2. In a machine tool, in combination, a rotary table having a central axis of rotation and an outer peripheral portion; a supporting frame located beneath and spaced from said table and having an upper annular portion directed toward said peripheral portion of said table; and a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation, said bearing means including at least three annular, coaxial bearing rings two of which are respectively fixed to said table and frame and the third of which is threadedly connected only with one of said two rings so that said third ring can be turned with respect to said one of said two rings for adjusting said bearing means without transmitting any forces to said table or frame when adjusting said bearing means.

3. In a machine tool, in combination, a rotary table having a central axis of rotation and an outer peripheral portion; a supporting frame located beneath and spaced from said table and having an upper annular portion directed toward said peripheral portion of said table; a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation, said bearing means including at least three annular, coaxial bearing rings two of which are respectively fixed to said table and frame and the third of which is threadedly connected only with one of said two rings so that said third ring can be turned with respect to said one of said two rings for adjusting said bearing means without transmitting any forces to said table or frame when adjusting said bearing means; the ring which is connected to said table being of a smaller diameter than the other rings and having an inner cylindrical surface defining the outer limit of said free space; a ring gear fixed to said inner cylindrical surface of said ring which is fixed to said table; and a pinion meshing with said ring gear so that when said pinion rotates the table to be rotated about its axis, the teeth of said ring gear and said pinion extend parallel to the axis of said table.

4. In a machine tool, in combination, a rotary table having a central axis of rotation and an outer peripheral portion; a supporting frame located beneath and spaced from said table and having an upper annular portion directed toward said peripheral portion of said table; a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation, said bearing means including at least three annular, coaxial bearing rings two of which are respectively fixed to said table and frame and the third of which is threadedly connected only with one of said two rings so that said third ring can be turned with respect to said one of said two rings for adjusting said bearing means without transmitting any forces to said table or frame when adjusting said bearing means, and said single bearing means including a releasable lock member carried by one of said two rings and engaging the third of said rings for locking said third ring in its adjusted position.

5. In a machine tool in combination, a rotary table having a central axis of rotation and an outer peripheral portion; a supporting frame located beneath and spaced from said table and having an upper annular portion directed toward said peripheral portion of said table; and a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation, said single bearing means including an inner ring fixed to said table, an outer ring fixed to said frame, and a third, adjusting ring threadedly connected with said outer ring for adjusting said bearing means, said adjusting and outer rings respectively having inner annular portions spaced from and directed toward each other with said inner annular portion of said adjusting ring having a lower face directed toward an upper face of said inner annular portion of said outer ring, said inner ring having an outer annular portion located between and spaced from said annular portions of said outer and adjusting rings and having an upper face spaced from and directed toward said lower face of said adjusting ring and a lower face spaced from and directed toward said upper face of said outer ring, a plurality of pairs of unground coaxial wire races engaging said lower face of said annular portion of said adjusting ring and a corresponding plurality of pairs of unground, coaxial wire races engaging said upper face of said outer annular portion of said inner ring and respectively aligned with said pairs of wire races engaging said adjusting ring, and a plurality of ball members located between and engaging each pair of wire races engaging said adjusting ring and the opposite pair of wire races engaging said inner ring, and a plurality of pairs of coaxial, unground wire races engaging said lower face of said outer annular portion of said inner ring and a corresponding plurality of pairs of unground, coaxial wire races engaging said upper face of said inner annular portion of said outer ring and respectively aligned with said wire races which engage said lower face of said inner ring, and a plurality of ball members located between and engaging each pair of wire races which engage said lower face of said inner ring and the opposite pair of wire races engaging said outer ring, the unground wire races providing a minimum area of contact between the ball members and the races, and the ball members between said adjusting ring and inner ring engaging the wire races which engage said adjusting ring and said upper face of said outer annular portion of said inner ring.

6. In a machine tool, in combination, a rotary table having a central axis of rotation and an outer peripheral portion, a supporting frame located beneath and spaced from said table and having an upper annular portion directed toward said peripheral portion of said table; and a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation, said single bearing means including an inner ring fixed to said table, an outer ring fixed to said frame, and a third, adjusting ring threadedly connected with said outer ring for adjusting said bearing means, said adjusting and outer rings respectively having inner annular portions spaced from and directed toward each other with said inner annular portion of said adjusting ring having a lower face directed toward an upper face of said inner annular portion of said outer ring, said inner ring having an outer annular portion located between and spaced from said annular portions of said outer and adjusting rings and having an upper face spaced from and directed toward said lower face of said adjusting ring and a lower face spaced from and directed toward said upper face of said outer ring, a plurality of pairs of unground coaxial wire races engaging said lower face of said annular portion of said adjusting ring and a corresponding plurality of pairs of unground, coaxial wire races engaging said upper face of said outer annular portion of said inner ring and respectively aligned with said pairs of wire races engaging said adjusting ring, and a plurality of ball members located between and engaging each pair of wire races engaging said adjusting ring and the opposite pair of wire races engaging said inner ring, and a plurality of pairs of coaxial, unground wire races engaging said lower face of said outer annular portion of said inner ring and a corresponding plurality of pairs of unground, coaxial wire races engaging said upper face of said inner annular portion of said outer ring and respectively aligned with said wire races which engage said lower face of said inner ring, and a plurality of ball members located between and engaging each pair of wire races which engage said lower face of said inner ring and the opposite pair of wire races engaging said outer ring, the unground wire races providing a minimum area of contact between the ball members and the races, and the ball members between said adjusting ring and inner ring engaging the wire races which engage said adjusting ring and said upper face of said outer annular portion of said inner ring at a plurality of points which in any plane which includes the axis of the table are located along a pair of mutually inclined straight lines which intersect at the axis of said table.

7. In a machine tool, in combination, a rotary table having a central axis of rotation and an outer peripheral portion; a supporting frame located beneath and spaced from said table and having an upper annular portion directed toward said peripheral portion of said table; and a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation, a single bearing means including an inner ring fixed to said table and having a lower outwardlly threaded portion, an outer ring fixed to said frame, and a third ring surrounding and threadedly connected with said lower portion of said inner ring for adjusting the bearing, said ring being surrounded by said outer ring, a first wire race carried by said third ring, a second wire race coaxial with and located over said first race and engaging said inner ring, and third and fourth races respectively coaxially surrounding and located respectively at the same elevation as said first and second races, said third and fourth races engaging said outer ring, and a plurality of ball members located between and engaging said races.

8. In a machine tool, in combination, a rotary table having a central axis of rotation and an outer peripheral portion; a supporting frame located beneath and spaced from said table and having an upper annular portion directed toward said peripheral portion of said table; and a single annular bearing means located between and connected to said table at said outer peripheral portion thereof and said frame at said upper annular portion thereof, said bearing means forming the only structure which supports the table for rotation about its axis and being located in its entirety in the region of said outer peripheral portion of said table coaxially therewith, said bearing means surrounding a free space beneath said table extending from a central portion of said table to said bearing means and available for purposes other than supporting the table for rotation, said single bearing means including an inner ring fixed to said table and having an upwardly directed race portion and an opposed downwardly directed race portion coaxial with said upwardly directed race portion, an outer ring having an upper internally threaded portion and provided with a lower upwardly directed race portion located opposite and facing said downwardly directed race portion of said inner ring, a plurality of ball members located between and engaging said downwardly directed race portion of said inner ring and said upwardly directed race portion of said outer ring, a third ring surrounded by and threadedly engaging said upper portion of said outer ring for adjusting the single bearing means and said third ring having a downwardly directed race portion located opposite and facing said upwardly directed race portion of said inner ring, and a second plurality of ball members located between and engaging said upwardly directed race portion of said inner ring and said downwardly directed race portion of said third ring.

References Cited in the file of this patent

UNITED STATES PATENTS

| | | |
|---|---|---|
| 1,219,921 | Collins | Mar. 20, 1917 |
| 1,946,835 | Buhr | Feb. 13, 1934 |
| 1,956,883 | Verderber | May 1, 1934 |
| 2,114,911 | Burt | Apr. 9, 1938 |
| 2,159,327 | Hendrick | May 23, 1939 |
| 2,183,362 | Zimmermann | Dec. 12, 1939 |
| 2,399,847 | Bauersfeld | May 7, 1946 |
| 2,465,497 | Turrettini | Mar. 29, 1949 |
| 2,536,937 | Hosea | Jan. 2, 1951 |
| 2,585,828 | Pearson | Feb. 12, 1952 |
| 2,640,400 | Verderber | June 2, 1953 |
| 2,783,687 | Roberts | Mar. 5, 1957 |
| 2,936,160 | Nilsson | May 10, 1960 |

FOREIGN PATENTS

| | | |
|---|---|---|
| 742,100 | Great Britain | Dec. 21, 1955 |